United States Patent [19]

Machguth et al.

[11] Patent Number: 5,345,864
[45] Date of Patent: Sep. 13, 1994

[54] PRINTING CYLINDER OF A ROTARY PRINTING PRESS AND A METHOD FOR USE THEREWITH

[75] Inventors: Günther Machguth, Wurenlos; Beat Müller, Mutschellen; Rolf Lehmann, Rudolfstetten; Eugen Schnyder, Waltenschwil, all of Switzerland

[73] Assignee: Sulzer-Escher Wyss AG, Zurich, Switzerland

[21] Appl. No.: 950,167

[22] Filed: Sep. 24, 1992

[30] Foreign Application Priority Data

Sep. 25, 1991 [CH] Switzerland .............. 02842/91-6

[51] Int. Cl.⁵ .................... B41F 5/00; B41F 13/10
[52] U.S. Cl. .................... 101/216; 101/375; 101/483; 492/7
[58] Field of Search ............ 492/6, 7, 16, 57, 58, 492/59, 28, 5, 4, 39; 101/375, 376, 216, 378, 415.1, 479, 483, 486

[56] References Cited

U.S. PATENT DOCUMENTS

| | | | |
|---|---|---|---|
| 3,166,013 | 1/1965 | Wyllie et al. | 101/378 |
| 3,253,323 | 5/1966 | Saueressig et al. | 101/415.1 X |
| 3,802,044 | 4/1974 | Spillmann et al. | 492/5 |
| 3,885,283 | 5/1975 | Biondetti | 492/7 |
| 5,111,566 | 5/1992 | Schnyder et al. | 492/7 |

FOREIGN PATENT DOCUMENTS

| | | |
|---|---|---|
| 0384104 | 8/1990 | European Pat. Off. |
| 2700118 | 7/1977 | Fed. Rep. of Germany |
| 8302811 | 3/1985 | Netherlands |
| 2051681 | 1/1981 | United Kingdom |

Primary Examiner—J. Reed Fisher
Attorney, Agent, or Firm—Sandler Greenblum & Bernstein

[57] ABSTRACT

A printing cylinder for a rotary printing press has a support, which is fixed against relative rotation, and a jacket rotatable around the latter, which is supported by a row of support elements, disposed axially side-by-side and individually controllable and radially displaceable at least in part in order to attain an even printing pressure across the width of the cylinder while avoiding any bending of the jacket. The jacket is constructed of three coaxial tubes, an interior tube, a filler body and a printing forme support, at least two of which, or even all three, in the rest state, are separated by a small gap so that they can be easily pulled off each other and exchanged in order to change the printing press over to another print pattern or another diameter or register. By charging the sealed interior chamber with pressure, for example with the use of the fluid pressure required for the support elements, the gap(s) are closed, so that the individual jacket parts have a press fit with each other and rotate together. By reducing the interior pressure to lower pressures, for example atmospheric pressure or a partial vacuum, it is possible to open the gap(s) again selectively.

22 Claims, 1 Drawing Sheet

PRINTING CYLINDER OF A ROTARY PRINTING PRESS AND A METHOD FOR USE THEREWITH

BACKGROUND OF THE INVENTION

1. Field of the Invention

The present invention relates to a printing cylinder for a rotary printing press with a jacket including a plurality of coaxial tubes, in particular a resilient interior tube, a filler body outside of the interior tube and a printing forme support on the outside of the filler body.

2. Description of Background and Material Information

Printing cylinders of the aforementioned type are employed in rotary printing presses of different types, in particular for rotogravure printing, flatbed printing, including offset printing, letterpress printing, including flexographic printing, and for embossing a web of material. As a rule, such printing cylinders act together with an impression cylinder on a web of material, for example made of paper, a printable or embossable foil of plastic or metal, or a fiber material for transferring the pattern of the printing cylinder to the web of material by means of ink or by embossing.

A printing cylinder of the aforementioned type is known, for example, from European Published Patent Application No. 0,384,104, published on Aug. 29, 1990. In this case the resilient inner body is wound from fiberglass-reinforced plastic. The filler body consists of foamed polyurethane, and the printing forme support of an electroplated copper layer or an engravable photopolymer, on the surface of which the pattern to be printed is applied.

As a rule, the jacket of the printing cylinder is connected with a driven shaft which rotates along with it, such as disclosed in Dutch Published Patent Application No. 8,302,811, published on Mar. 1, 1985. To change the printing press to another diameter, i.e., another register or another format, it is necessary either to exchange the printing cylinder for one with an appropriate diameter or the jacket has to be separated from the shaft and pulled off, which often can only be done with difficulty.

A printing cylinder is known from British Published Patent Application No. 2,051,681, published on Jan. 21, 1981, or German Patent No. 2,700,118, published on Jul. 14, 1977, where the inner part of the jacket is embodied as a pressure-tight hollow cylinder, which is provided at its two ends with journals which rotate along with it. The outer concentric jacket layer which supports the print backing is seated frictionally engaged on the inner part of the jacket. If needed, it can be separated from the inner part by means of gas under pressure, which is brought via bores from the inner part of the jacket into the space between the inner part of the jacket and the outer part. However, the removal of the outer part of the jacket presents difficulties here too, because of the considerable loss of pressure gas and the uneven expansion of the outer part.

When printing ever wider webs and correspondingly using ever longer printing cylinders, particularly when keeping the format, i.e., with an increase of the length-diameter ratio from a value of 10:1, customary up to now, to values of 15:1 or more, it also becomes problematical to achieve an even printing quality over the entire width of the web. This would require an even distribution of pressure, at least over the utilized length of the printing cylinder. Attempts have already been made to embody the counter-pressure roller or the impression cylinder cooperating with the printing cylinder in such a way that the latter exerts a printing pressure on the printing cylinder or the web to be imprinted, which can be at least partially individually adjusted over the web width or cylinder length. This is often sufficient to achieve the desired print quality with smaller rotary printing presses having shorter printing cylinders.

With greater printing width and correspondingly longer printing cylinders the pressure can be maintained evenly with appropriately embodied impression cylinders. But the sagging of the printing cylinder caused by the pressure is sufficiently great that the ink application over the width of the roller and possibly the scraping off of the ink by the doctor blades over the width become uneven, because as a rule the ink roller and the doctor blade cannot follow the bending of the printing cylinder to the required degree. This causes register fluctuations, color fluctuations and the formation of creases in the web of material. Thus, there is insufficient assurance of an even printing pressure over the width alone in case of wider printing presses.

With longer printing cylinders for web widths up to the range of approximately 10 meters, the change to another register and the exchange of the printing forme support by pulling off the outer part of the cylinder jacket can not be accomplished by means of the known methods.

SUMMARY OF THE INVENTION

Therefore, with the foregoing in mind, it is a primary object of the present invention to provide an improved printing cylinder that is not afflicted with the aforementioned limitations and disadvantages of the prior art.

Another and more specific object of the present invention is to provide a printing cylinder which permits the attainment of an improved and, in particular, more even print and embossing quality over the width, even with wider rotary printing presses, where the printing press and the printing cylinder can be changed in a simple manner to a different register or cylinder diameter and where the printing forme support can be easily exchanged.

Now in order to implement these and still further objects of the present invention, which will become more readily apparent as the description proceeds, the jacket is rotatable around a support which is seated fixed against relative rotation, and is supported against the support in a printing plane by a row of support elements, which are disposed axially next to each other and which provide at least partially individually adjustable printing pressures, and which can be radially displaced in the printing plane, that the inner chamber of the jacket is pressure-tight and can be charged with pressure, that the jacket has at least one cylindrical, coaxial gap which permits the separation of at least one of the outer coaxial tubes from at least one of the interior tubes, and that the inner chamber of the jacket can be selectively charged with different pressures, so that the gap(s) between the coaxial tubes selectively have a sliding fit or, because of a resilient deformation of the interior tube, a press fit with each other.

More specifically, according to the present invention, the interior tube is advantageously embodied to be non-rigid. For example, it is made of fiberglass-reinforced plastic with such an elastic modulus and such a wall thickness that the product of the moment of cross-sectional inertia and the elastic bending modulus is at least fifty times smaller than that of a suitable steel tube of, for example, a 15 millimeter thickness.

The required even printing pressure can also be generated in a non-rigid interior tube of a jacket having a small wall thickness by means of the support elements. There, the support elements support the non-rigid interior tube in such a way that pulling the outer part of the jacket on or off is easily possible.

In this connection, it is particularly advantageous to embody the support elements as hydrostatic support elements, which are supplied with a pressure fluid which is under controlled pressure. The interior pressure building up because of the fluid pressure in the jacket interior causes automatic closing of the gap(s) during operation of the printing press. At the same time, it assures an extremely low-friction rotation of the jacket around the support which is fixed against relative rotation and counteracts bending caused by the printing pressure.

It is then possible to set the interior pressure advantageously by means of a regulating valve in the discharge line of the pressure fluid from the jacket interior. The nonrigid interior tube of the jacket makes it possible in this case to operate with low interior pressure, for example below 20 bar.

A gap between the interior tube and filler body is advantageously provided, which during operation is closed, because the inner chamber of the jacket is under pressure, and by deformation of the interior tube, so that a press fit results. During pressure reduction there is sufficient play for pulling off the filler body, so that the printing cylinder can be easily changed to a different diameter and registration.

However, additionally or instead, it can also be advantageous to provide a coaxial gap between the filler body and the printing forme support, which is also closed by admission of pressure to the jacket interior and which permits a particularly simple exchange of the printing forme support when pressure is reduced. Also, one gap each can be provided between the interior tube and the filler body and between the filler body and the printing forme support. In this case all gaps are closed when there is working pressure in the jacket interior. If pressure is somewhat reduced, the outer gap between the filler body and the printing forme support is formed. At an even lesser pressure, for example exterior pressure or a vacuum, the gap between the interior tube and the filler body is additionally opened.

It is of particular advantage to operate the printing cylinder in accordance with the invention in cooperation with an impression cylinder, which also provides a counter force which is individually controllable over its length by means of analogous support elements. In this way, bending of the printing cylinder as well as the impression cylinder can be practically completely eliminated.

In a dual printing press the cooperation between two identically embodied printing cylinders is also possible for simultaneous printing of both sides of the web.

The invention will be described in detail by means of the exemplary embodiments illustrated in the drawings.

BRIEF DESCRIPTION OF THE DRAWINGS

The above and additional objects, characteristics, and advantages of the present invention will become apparent in the following detailed description of a preferred embodiment, with reference to the accompanying drawings which are presented as non-limiting examples, in which.

DETAILED DESCRIPTION OF PREFERRED EMBODIMENTS

With respect to the drawings, only enough of the construction of the invention has been depicted, to simplify the illustration, as needed for those of ordinary skill in the art to readily understand the underlying principles and concepts of the present invention.

Figures 1, 2:
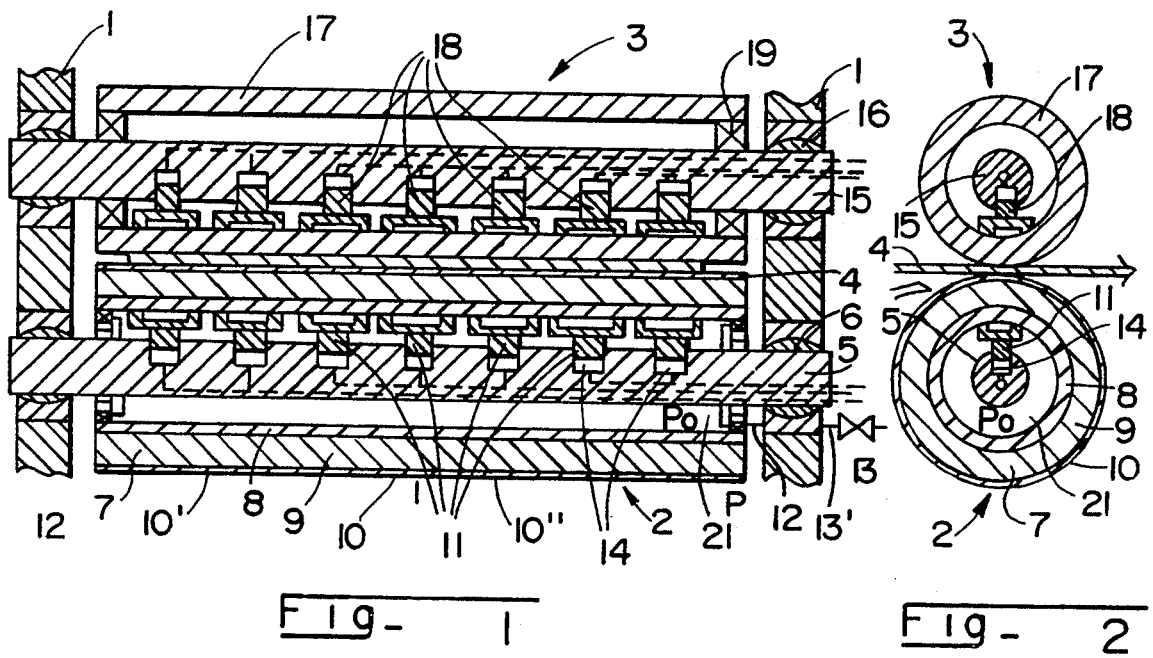
FIG. 1 is a view in axial section of a printing unit of a rotary printing press.
FIG. 2 is a view in radial section of the printing unit of the invention.

Turning attention now to the drawings, and specifically FIGS. 1 and 2, a printing cylinder 2 and an impression cylinder 3 of the printing unit are shown as being seated in a frame 1. A web 4 of material to be printed or embossed, for example a web of paper, plastic, textile or fiber material, runs between them. A print or embossing pattern provided on the surface of the printing cylinder 2 is transferred to the web 4 of material by means of the linear pressure exerted in the print gap between printing cylinder 2 and the impression cylinder 3.

The printing cylinder comprises a support 5, which is fixed against relative rotation and is seated in the machine frame 1 by rocker bearings 6, for example, as well as a jacket 7, rotatable around the fixed support 5, and provided with a suitable drive. It also drives the impression cylinder 3 via the rotation of the jacket 7 and pulls the material web 4 through the print gap between the printing cylinder 2 and the impression cylinder 3.

In the exemplary embodiment shown, the jacket 7 consists of three coaxial tubes. The innermost tube is embodied as a non-rigid interior tube 8 with a wall thickness of one to several millimeters. With a diameter in the range of approximately 30 centimeters, interior tube 8 can be wound crosswise from several layers of, for example, fiberglass-reinforced plastic having a modulus of elasticity of approximately 1000–10000 N/mm$^2$, for example. An interior tube of polymer material, for example pressure-setting plastic, can also be suitable.

A filler body 9 of a somewhat softer resilient material, for example a suitable elastomer, with a wall thickness of a few centimeters is provided adjoining radially on the outside. A foamed material or one having a honeycomb structure with a correspondingly light weight are also suitable.

A printing forme support 10 is provided on the outside of this filler body 9, which supports the print or embossing cylinder on its outside. Depending on the printing process selected, i.e., rotogravure printing, flatbed printing or letterpress printing, the printing forme support can consist of a thin metal layer or foil, for example electroplated copper with a wall thickness in the range of tenths of a millimeter, of printing plates of zinc or the like or of plastic, or of a metallic embossing mold having a wall thickness in the range of millimeters. In this case the pattern to be printed is applied on the surface of the printing forme support 10 by engraving, etching, casting or forming, depending on the printing process. When printing several individual supports side-by-side, it is also possible to provide a plurality of individual print backings 10', 10" side-by-side on the filler body.

The diameters of the three coaxial tubes 8, 9 and 10 of the jacket 7 have been selected such that in the non-loaded position of rest a thin coaxial gap in the range of tenths of a millimeter is provided between at least two of said tubes 8, 9 and 10. In addition, the outer diameter of the interior tube 8 has been selected to be smaller by some tenths of a millimeter than the inner diameter of the filler body 9, or the outer diameter of the filler body 9 is smaller by some tenths of a millimeter than the inner diameter of the printing forme support 10. However, both possibilities can be provided, so that a thin gap is open in the position of rest between the interior tube 8 and the filler body 9 as well as between the filler body 9 and the printing forme support 10. By means of this it is made possible to pull off at least one outer part of the jacket 7 from the inner part, the inner part remaining on the printing cylinder 2. Thus, the printing forme support 10 can be pulled off the filler body 9 and replaced by another printing forme support 10 with another print pattern. Because of this, the print pattern can be changed rapidly and easily without having to dismantle the printing cylinder. On the other hand, it may also be intended to exchange the filler body 9 for one with a different diameter in order to be able to change the printing press to another register and a different format.

The jacket 7 is supported in the interior of the printing cylinder 2 by support elements 11 on the support 5, which can exert a controllable printing pressure in the printing direction on the inside of the jacket 7. These can advantageously be hydrostatic support elements, such as are known for the seating or support of other machine parts from the U.S. Pat. No. 3,802,044, issued on Apr. 9, 1974, the disclosure of which is hereby expressly incorporated by reference thereto in its entirety. In this case the support elements are movable in the printing direction inside a pressure chamber supplied with a pressure fluid at controllable pressure, so that they are able to follow a movement of the jacket 7 with respect to the support 5 with unchanged printing pressure. The seating pockets 14 provided on the seating surface of the support elements 11, which are supplied with pressure fluid from the pressure chamber, provide an almost friction-free rotatability of the jacket 7.

As can be seen in FIG. 1, a row of such hydrostatic support elements are provided next to each other in the axial direction of the printing cylinder 2 or the support 5 and support the jacket 7 over its entire length with respect to the support 5. The individual support elements 11 are controllable independently of each other at least in part, so that they exert an individually controllable printing pressure on the jacket 7 in the pressure plane. To do this in the case of hydrostatic support elements, the pressure in the pressure chambers of the individual support elements is separately controllable. All support elements 11 can be separately triggerable for this, or several support elements can be combined in a group with the individual groups being individually controllable. It is possible in this way to attain, through the appropriate individual triggering of the separate support elements, that the jacket 7 shows almost no bending regardless of the width and length of the material web, even with large printing pressures. Only the bending of the support 5 occurs, while the support elements 11 following in the print direction ensure an exact alignment of the printing cylinder jacket 7 while preventing bending, as well as an even printing pressure over the width of the cylinder. To prevent the deflection of the jacket 7 perpendicularly to the printing plane and register fluctuations between the edge and the center of the web, additional further support devices are provided perpendicularly to the support elements 11.

It should be noted that, instead of hydrostatic support elements, the use of different support elements having an equivalent effect, for example, hydrodynamic, pneumatic or magnetic support elements and the like, is also possible.

The interior of the printing cylinder 2 is sealed towards the outside hermetically and pressure-tight at both ends except for fluid conduit 13' at one end thereof 12. In connection with certain types of use, this seal 12 is advantageously embodied in such a way that the ends of the jacket 7 are also movable in respect to the support 5 over a defined range in the printing direction. In this way the printing cylinder 2 can be placed against the impression cylinder 3 by means of the support elements 11 and the printing pressure can be simultaneously generated. A pressure-tight connecting link guide, such as described, for example, in U.S. Pat. No. 3,885,283, issued on May 27, 1975, the disclosure of which is hereby expressly incorporated by reference thereto in its entirety, or a suitable pivot arm or parallelogram guide or the like, can be used for this.

The sealed inner chamber 21 of the jacket 7 can be charged with controllable pressure, for example with a pressure gas or another pressure fluid, which can be used simultaneously for cooling. In the case of the use of hydrostatic elements which are supplied with pressure fluid anyway, this pressure fluid itself can be used for providing the pressure, in that the pressure fluid removal is throttled by means of a regulating valve 13, by means of which the desired pressure in the jacket interior can be set.

This interior pressure $P_0$ is set during the printing operation in such a way that, as shown in FIG. 2, the interior tube 8 and the filler body 9 have resiliently expanded sufficiently far that all gaps between the individual coaxial tubes 8, 9 and 10 of the jacket 7 have been closed and that the interior tube 8 and filler body 9 or the filler body 9 and the printing forme support 10 have an interlocking press fit and rotate together at exactly the same rpm or speed.

Figures 3, 4:
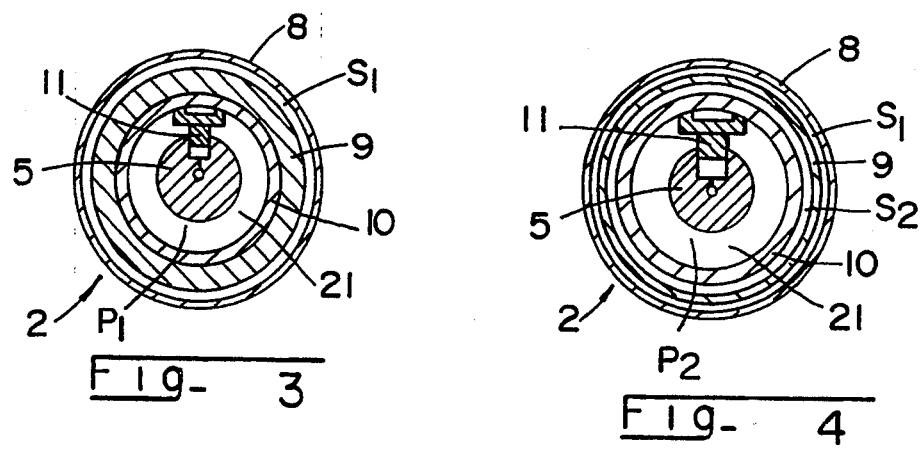
FIG. 3 is a view in radial section of a printing cylinder in a halfway open position.
FIG. 4 is a view in radial section of a printing cylinder in a completely open position.

FIG. 3 shows the conditions under reduced inner pressure $p_1$ in case of a printing cylinder 2 having a gap S1 between the filler body 9 and the printing forme support 10. The reduced inner pressure $p_1$ has been selected to be such that the interior tube 8 and the filler body 9 have only been deformed far enough that the gap S1 between the filler body 9 and the forme support 10 is opened, while the filler body 9 still firmly adheres to the interior tube 8. This permits the removal of the printing forme support 10 from the filler body 9 without effort and to exchange it for another printing forme support 10, while the filler body 9 remains on the interior tube 8. It can be practical to select this reduced pressure to be equal to atmospheric pressure p, so that the interior of the jacket need not be charged with pressure for exchanging the printing forme support 10.

FIG. 4 shows the conditions under further reduced inner pressure $p_2$ of the roller interior. In this case the pressure $p_2$ has been reduced so far that not only the outer gap S1 between the printing forme support 10 and the filler body 9 has been opened, but also the inner gap S2 between the filler body 9 and the interior tube 8. This permits easy removal of the filler body 9 with the printing forme support 10 from the interior tube 8, so that the printing cylinder 2 can be changed without effort to a different diameter and registration. The further reduced pressure $p_2$ required for this can be a partial vacuum, which is an advantage in connection with printing cylinders with three jacket tubes which can be separated from each other, or atmospheric pressure p, which is an advantage with printing cylinders with only two separable jacket parts, for example in case of printing forme supports 10 which are fixedly connected with the filler body 9, for example printing forme supports electroplated on the filler body 9.

It should be noted that, depending on the printing process, it is possible to provide only a gap S1 between the filler body 9 and the printing forme support 10, or only a gap S2 between the interior tube 8 and the filler body 9, or a gap S1 and S2 each between all tubes 8, 9 and 10 of the jacket 7.

The impression cylinder 3 cooperating with the printing cylinder 2 in a rotary printing press can be embodied in a conventional way. However, this impression cylinder 3 can also advantageously be provided with a support 15 which is fixed against relative rotation and is also seated in rocker bearings 16 in the machine frame 1 in a manner analogous to the printing cylinder 12. An impression cylinder jacket 17 is rotatably seated around this support and supported on the support 15 by a row of support elements 18 placed axially side-by-side. Because of this it is possible to attain bending of the printing cylinder 2 and the impression cylinder 3 by the individual control of the support elements 18 analogously to the printing cylinder 2 even under extreme conditions, and thus an exactly level print gap and an exactly straight contact line for the doctor blade and the ink application roller.

The impression cylinder 3 can be provided with an electrostatic pressure assist, if needed, which is coupled over the entire width with the support elements 18 and is synchronously controlled.

The impression roller jacket 17 can be seated with its ends directly on the support 15 by means of self-aligning bearings 19. If in this case the printing cylinder is provided with a bearing of the jacket ends which is movable in the printing direction, the required printing pressure can be adjusted completely evenly over the width of the web by means of the support elements 11 and 18 alone.

Figure 5:
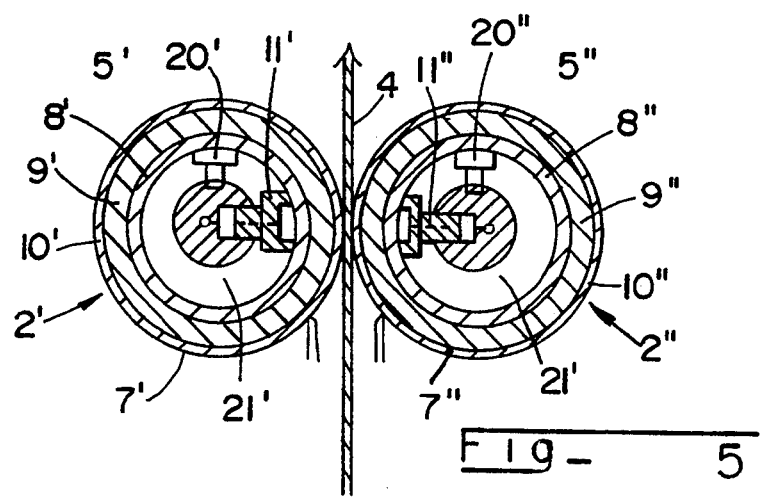
FIG. 5 a view in radial section of a dual printing unit.

In place of an imprinting roller, a printing cylinder 2' can also cooperate with a printing cylinder 2" which to a large extent is of the same construction, as shown in FIG. 5. This is of particular advantage in dual printing units, where both sides of the paper web are printed simultaneously and where each one of the two printing cylinders 2' and 2" has a different printing forme support 10' and 10". Otherwise the jackets 7' and 7" of the two printing cylinders are constructed completely analogously, as are the rows of support elements 11' and 11". In case no exterior adjusting device is provided, the two printing cylinders 2' and 2" can differ only in that the ends of one of the printing cylinders are seated movable in the printing direction, while the ends of the other printing cylinder are fixedly seated in the associated support.

In this exemplary embodiment the axes of the two printing cylinders 2' and 2" are advantageously disposed horizontally next to each other, so that the paper web 4 runs vertically between the two printing cylinders 2' and 2", instead of horizontally, as in the previously described exemplary embodiment. An additional vertical support 20', 20" of the jackets 7' and 7" is required to compensate their own weight and to prevent vertical sagging.

This application is based upon Swiss Application No. 02842/91-6, filed on Sep. 25, 1991, the priority of which is claimed and the disclosure of which is hereby expressly incorporated by reference thereto in its entirety.

Finally, although the invention has been described with reference of particular means, materials and embodiments, it is to be understood that the invention is not limited to the particulars disclosed and extends to all equivalents within the scope of the claims.

What is claimed is:

1. A printing cylinder for a rotary printing press, said printing cylinder comprising:
   a jacket comprising a plurality of coaxial tubes, said plurality of coaxial tubes comprising:
      a resilient interior tube;
      a filler body exterior of said interior tuber and
      a printing forme support exterior of said filler body;
   a support fixedly secured against rotation relative to said jacket, said jacket being rotatable around said support;
   a row of support elements disposed axially next to each other for providing at least partially individually adjustable printing pressures, said support elements being mounted on said support for radial displacement in a printing plane, said jacket being supported by said support elements in the printing plane;
   said jacket having an inner chamber;
   said jacket having at least one cylindrical, coaxial gap for permitting separation of at least one of said filler body and said printing forme support from at least one of said interior tube and said filler body;
   means for sealing said inner chamber of said jacket to be pressure-tight; and
   means for selectively charging said inner chamber with different pressures so that said at least one cylindrical, coaxial gap between said plurality of coaxial tubes selectively define a sliding fit or, because of a resilient deformation of said interior tube upon an application of a predeterminate pressure by said means for charging, a press fit with each other.

2. A printing cylinder in accordance with claim 1, wherein:
   said interior tube is made of a non-rigid plastic with a modulus of elasticity from 1000 to 10000 $N/mm^2$.

3. A printing cylinder in accordance with claim 1, wherein:
   said at least one gap is provided between said interior tube and said filler body; and
   said means for selectively charging said inner chamber with different pressures comprises:
      means for charging said inner chamber of said jacket with pressure and thereby deforming said interior tube to close said gap between said interior tube and said filler body, so that a press fit between said interior tube and said filler body is achieved, and
      means for charging said inner chamber of said jacket with reduced pressure for generating sufficient play with respect to said interior tube so that a sliding fit between said interior tube and said filler body is achieved.

4. A printing cylinder in accordance with claim 3, wherein:
said reduced pressure is atmospheric pressure.

5. A printing cylinder in accordance with claim 3, wherein:
said reduced pressure is a pressure below atmospheric pressure.

6. A printing cylinder in accordance with claim 1, wherein:
said gap is provided between said filler body and said printing forme support and is closed by charging said jacket interior with pressure and that with a reduced pressure sufficient play is available with respect to said filler body for pulling off said printing forme support.

7. A printing cylinder in accordance with claim 6, wherein:
said jacket interior can be selectively charged with two pressures different from normal pressure, so that with a charge with one of said two pressures a gap is formed between said printing forme support and said filler body, while with a charge of the other of said pressures a gap is formed between said filler body and said interior tube.

8. A printing cylinder in accordance with claim 1, wherein:
said support elements are embodied as hydraulic support elements;
said means for selectively charging said inner chamber with different pressures comprises means for charging said inner chamber with a pressure fluid under a controllable pressure and for building in the jacket interior a sufficient pressure for closing of said at least one gap between said interior tube, said filler body or said printing forme support.

9. A printing cylinder in accordance with claim 8, further comprising:
means for providing adjustable printing pressures to said support elements, said support elements having hydrostatic bearing faces, wherein said means for providing adjustable printing pressures comprise means for supplying said support elements with the pressure fluid for generating the printing pressure.

10. A printing cylinder in accordance with claim 8, wherein:
the pressure fluid can be taken out of the jacket interior via a regulating valve, by means of which the interior pressure in said jacket interior can be adjusted.

11. A printing cylinder in accordance with claim 1 in combination with an impression cylinder mounted adjacent said printing cylinder, said impression cylinder comprising a jacket; a support fixedly secured against rotation relative to said jacket, said jacket being rotatable around said support; and a row of support elements mounted on said support for supporting said jacket in said printing plane.

12. A printing cylinder in accordance with claim 1 in combination with a similarly constructed second printing cylinder in a dual printing unit.

13. A method of using a printing cylinder of a rotary printing press, in which the printing cylinder comprises a jacket having a plurality of coaxial tubes, said plurality of coaxial tubes including a resilient interior tube, a filler body exterior of said interior tube, and a printing forme support exterior of said filler body, said printing cylinder further comprising a support fixedly secured against rotation relative to said jacket, said jacket being rotatable around said support, a row of support elements disposed axially next to each other for providing at least partially individually adjustable printing pressures, said support elements being mounted on said support for radial displacement in a printing plane, said jacket being supported by said support elements in the printing plane, said jacket having an inner chamber that is pressure-tight and chargeable with pressure, said inner chamber of said jacket being selectively chargeable with different pressures to define between adjacent ones of said plurality of coaxial tubes a press fit or, because of a resilient deformation of one or more of said plurality of tubes, a sliding fit with each other, said method comprising the steps of:
maintaining said inner chamber at a predetermined pressure; and
reducing said pressure to a predeterminate amount for causing resilient deformation of at least one of said interior tube and said filler body and for defining between adjacent ones of said plurality of coaxial tubes a sliding fit.

14. A method in accordance with claim 13, wherein:
said step of maintaining said inner chamber at a predetermined pressure comprises charging said inner chamber with a pressure greater than atmospheric pressure so as to resiliently expand said interior tube and said filler body sufficiently far so that any gaps between said interior tube, said filler body and said printing forme support are closed and that said interior tube, said filler body and said printing forme support have a press fit and are rotatable together.

15. A method in accordance with claim 13, wherein:
said step of maintaining said inner chamber at a predetermined pressure comprises maintaining said inner chamber at atmospheric pressure, whereby said interior tube and said filler body are deformed far enough so that a gap between said filler body and said printing forme support is opened and said filler body and said interior tube maintain a press fit.

16. A method in accordance with claim 13, wherein:
said step of maintaining said inner chamber at a predetermined pressure comprises charging said inner chamber with a pressure less than atmospheric pressure so as to deform said interior tube and said filler body far enough so that a gap between said filler body and said printing forme support is opened and said filler body and said interior tube maintain a press fit.

17. A method in accordance with claim 13, wherein:
said step of maintaining said inner chamber at a predetermined pressure comprises charging said inner chamber with a pressure less than atmospheric pressure so that a gap between said filler body and said interior tube is opened and said filler body and said printing forme support maintain a press fit.

18. A method in accordance with claim 13, wherein:
said step of maintaining said inner chamber at a predetermined pressure comprises charging said inner chamber with a pressure less than atmospheric pressure so that a first gap between said filler body and said printing forme support is opened and a second gap between said filler body and said interior tube is opened.

19. A printing cylinder for a rotary printing press, said printing cylinder comprising:

a jacket comprising a plurality of coaxial tubes, said plurality of coaxial tubes comprising:
  a resilient interior tube;
  a resilient filler body exterior of said interior tube; and
  a printing forme support exterior of said filler body;
a support fixedly secured against rotation relative to said jacket, said jacket being rotatable around said support;
a row of support elements disposed axially next to each other for providing at least partially individually adjustable printing pressures, said support elements being mounted on said support for radial displacement in a printing plane, said jacket being supported by said support elements in the printing plane;
said jacket having an inner chamber;
said jacket having at least one cylindrical, coaxial gap for permitting separation of at least one of said filler body and said printing forme support from at least one of said interior tube and said filler body;
means for sealing said inner chamber of said jacket to be pressure-tight; and
means for communicating said inner chamber with a source of pressure and for selectively maintaining said inner chamber at respective predeterminate different pressures, said means for communicating and selectively maintaining including means for selectively:
  (1) maintaining said inner chamber at a first pressure for applying a resilient force exerted by said resilient filler body against said printing forme support to thereby define a press fit between said filler body and said printing forme support; or
  (2) maintaining said inner chamber at a second pressure, said second pressure being less than said first pressure, for discontinuing said resilient force exerted by said resilient filler body against said printing forme support to thereby define a sliding fit between said filler body and said printing forme support for facilitating removal of said printing forme support.

20. A printing cylinder for a rotary printing press, said printing cylinder comprising:
  a jacket comprising a plurality of coaxial tubes, said plurality of coaxial tubes comprising:
    a resilient interior tube;
    a resilient filler body exterior of said interior tube; and
    a printing forme support exterior of said filler body;
  a support fixedly secured against rotation relative to said jacket, said jacket being rotatable around said support;
  a row of support elements disposed axially next to each other for providing at least partially individually adjustable printing pressures, said support elements being mounted on said support for radial displacement in a printing plane, said jacket being supported by said support elements in the printing plane;
  said jacket having an inner chamber;
  said jacket having a first cylindrical, coaxial gap between said filler body and said printing forme support in a first predetermined configuration of said printing cylinder and, in a second predetermined configuration of said printing cylinder, said jacket having a second cylindrical, coaxial gap between said interior tube;
  means for sealing said inner chamber of said jacket to be pressure-tight; and
  means for communicating said inner chamber with a source of pressure and for selectively maintaining said inner chamber at respective predeterminate different pressures, said means for communicating and selectively maintaining including means for selectively:
    (1) maintaining said inner chamber at a first pressure for applying a resilient force exerted by said resilient interior tube against said filler body to thereby define a press fit between said interior tube and said filler body, and for applying a resilient force exerted by said resilient filler body against said printing forme support to thereby define a press fit between said filler body and said printing forme support;
    (2) maintaining said inner chamber at a second pressure, said second pressure being less than said first pressure, for discontinuing said resilient force exerted by said resilient filler body against said printing forme support to thereby define a sliding fit between said filler body and said printing forme support in said first predetermined configuration of said printing cylinder; or
    (3) maintaining said inner chamber at a third pressure, said third pressure being less than said second pressure, for discontinuing said resilient force exerted by said resilient interior tube against said filler body to thereby define a sliding fit between said interior tube and said filler body, and for discontinuing said resilient force exerted by said resilient filler body against said printing forme support to thereby define a sliding fit between said filler body and said printing forme support in said second predetermined configuration of said printing cylinder.

21. A printing cylinder in accordance with claim 20, wherein said means for selectively maintaining said inner chamber at a second pressure comprises means for maintaining said inner chamber at atmospheric pressure.

22. A printing cylinder in accordance with claim 20, wherein said means for selectively maintaining said inner chamber at a third pressure comprises means for maintaining said inner chamber at a pressure below atmospheric pressure.

* * * * *